(12) United States Patent
Sistla et al.

(10) Patent No.: US 7,730,266 B2
(45) Date of Patent: Jun. 1, 2010

(54) ADAPTIVE RANGE SNOOP FILTERING METHODS AND APPARATUSES

(75) Inventors: Krishnakanth Sistla, Hillsboro, OR (US); Steven R. Hutsell, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 11/695,004

(22) Filed: Mar. 31, 2007

(65) Prior Publication Data

US 2008/0244193 A1 Oct. 2, 2008

(51) Int. Cl.
*G06F 13/00* (2006.01)
(52) U.S. Cl. .................... 711/146; 711/141
(58) Field of Classification Search ............ 711/146
See application file for complete search history.

(56) References Cited

U.S. PATENT DOCUMENTS 7,089,376 B2 *   8/2006  Dieffenderfer et al. ...... 711/146
7,308,538 B2 * 12/2007  Shen .......................... 711/141
7,437,520 B2 * 10/2008  Shen et al. .................. 711/146
2006/0095684 A1 * 5/2006  Shen .......................... 711/146

* cited by examiner

*Primary Examiner*—Mardochee Chery
(74) *Attorney, Agent, or Firm*—Schubert Osterrieder & Nickelson PLLC; Garland Charpiot

(57) ABSTRACT

Snoop filtering methods and apparatuses for systems utilizing memory are contemplated. Method embodiments comprise receiving a request for contents of a memory line by a home agent, comparing an address of the memory line to a range in a set of adaptive ranges, and snooping an I/O agent for the contents upon a match of the address within the range. Apparatus embodiments comprise a range table, a table updater, a receiver module, and a range comparator. The range tables allow for the tracking of memory addresses as I/O agents assert ownership of the addresses. Employing a range-based snoop filtering approach may allow home agents to track a collection of addresses, in adaptable ranges, instead of tracking precise addresses which may require large quantities of memory to implement.

15 Claims, 4 Drawing Sheets

ADAPTIVE RANGE SNOOP FILTERING METHODS AND APPARATUSES

FIELD

The present invention is in the field of electronic memory systems. More particularly, the present invention relates to snoop filtering methods and apparatuses for systems utilizing memory.

BACKGROUND

While the configurations of processors and memory systems vary from one computer system to another, one processor-memory interconnect topology relatively common today is referred to as the distributed shared memory interconnect topology. In distributed shared memory systems, each processor usually contains a local memory controller. The local memory for each individual processor may be mapped into a global memory space in order to provide a single memory space available to all processors. In order to maintain coherency, one or more system components must generally snoop all caches in the system. Instead of comprehensively snooping all caches, some systems may instead filter some of the snooping activities. Depending on the interconnect topology and the snoop latency of caches in the system, system and/or memory performance could be limited by snooping activities.

To facilitate information transfer to and from a processor, many systems use an Input-Output (I/O) agent While I/O agents typically contain small caches, referred as write caches, the I/O agents nonetheless run at much lower frequencies than the processors, respond to snoops in a relatively slow fashion, and frequently tend to limit the speed of memory accesses in computer systems. Since I/O agents usually contain relatively small amounts of memory lines, such as 128 or 256 lines, there is usually a high probability that I/O agents do not contain a memory line that may be requested by another system agent. Consequently, most I/O snoops will be clean and the snooping operations tend to unnecessarily increase the memory latency in a system.

Several techniques have been proposed to filter snoops to system agents, such as I/O agents. The I/O Agent Directory is a scheme in which each line in memory is tagged with bits to indicate whether an I/O agent contains a particular memory line or not. Since this scheme requires bits for each line in memory, it may waste memory space. Such memory waste is often not desirable in small memory systems. In another scheme, each processor tracks each memory line in an I/O agent using a 1-1 relationship. Unfortunately, this technique is not very scalable as the number of agents in a system, such as I/O agents, grows. Additionally, as the sizes of I/O agent write caches increase, the size of the filters in the processors must grow.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

Figure 1A:
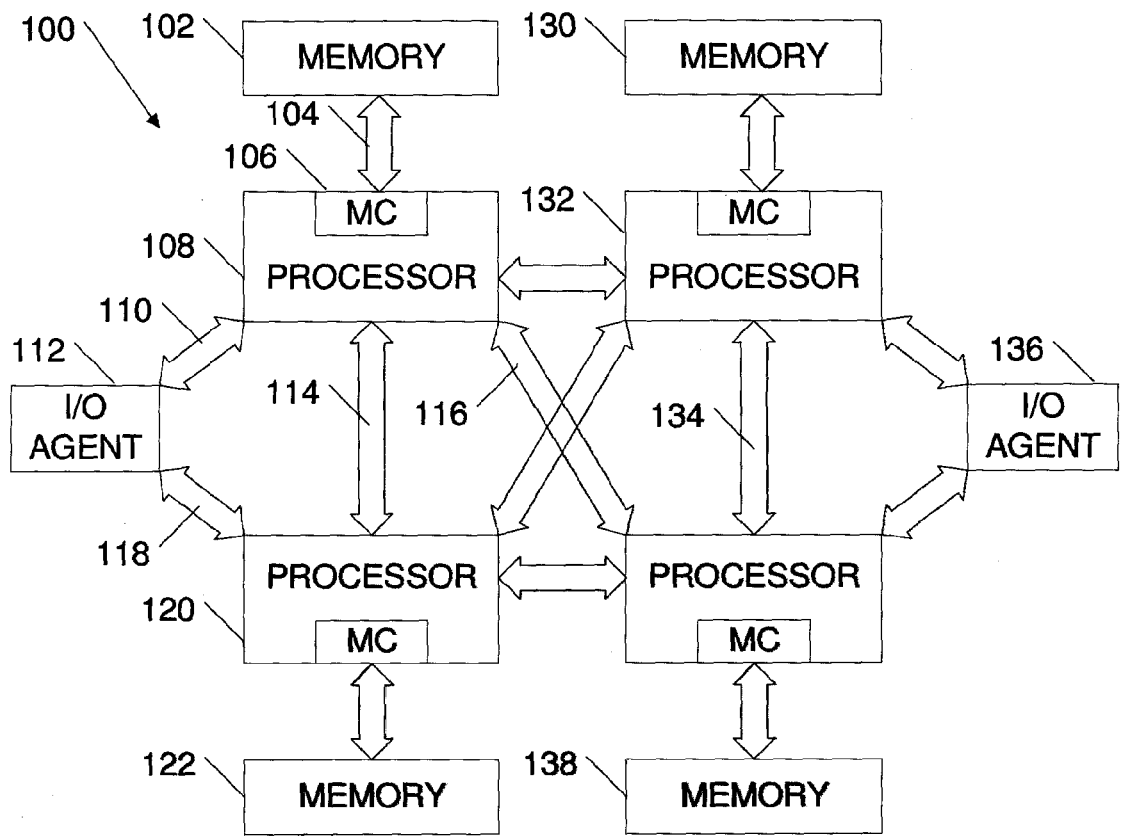
FIG. 1A depicts a quad-processor distributed shared memory system.

The following is a detailed description of embodiments depicted in the accompanying drawings. The specification is in such detail as to clearly communicate the various embodiments. However, the amount of detail offered is not intended to limit the anticipated variations of embodiments; but on the contrary, the intention is to cover all modifications, equivalents, and alternatives falling within the spirit and scope of the embodiments defined by the appended claims. The detailed descriptions below are designed to make such embodiments obvious to a person of ordinary skill in the art.

Generally speaking, snoop filtering methods and apparatuses for systems utilizing memory are contemplated. The method embodiments generally comprise receiving a request for contents of a memory line by a home agent, comparing an address of the memory line to a range in a set of adaptive ranges, and snooping an I/O agent for the contents upon a match of the address with the range. In these embodiments, the methods generally update the set of adaptive ranges after receiving a request form the I/O agent. In many method embodiments, counters associated with individual ranges may be incremented and decremented to assist tracking numerous memory lines within the individual ranges. The embodiments generally set status bits for the individual ranges when the I/O agent asserts ownership. Additionally, the embodiments generally adjust the upper or lower addresses in the individual ranges to reflect new memory lines being added within the ranges.

Apparatus embodiments comprise a range table, a table updater, a receiver module, and a range comparator. The range tables may allow for the tracking of memory addresses as I/O agents assert ownership of the addresses. The table updater updates the range table as the I/O agents assert ownership, such as determining and storing the upper and lower address numbers for the individual ranges in the range table. A receiver module receives requests for contents of memory lines from various system agents. Upon reception of the requests, the apparatus embodiments may comprise a comparator to compare the address of the requested memory line to addresses in the range table. If the comparator finds that the requested address matches a range of the range table, it allows a snoop of one or more I/O agents in the system.

Alternative apparatus embodiments may comprise status bits which allow detailed status tracking of individual ranges, such as when an I/O agent establishes ownership for an address in the range and when it relinquishes ownership to another agent in the system. In many apparatus embodiments, the table updater may update the status bits as the I/O agent establishes and relinquishes ownership. Additionally, the apparatus embodiments may contain counters to track when one or more I/O agents establish and relinquish ownership of multiple memory lines in a range.

While portions of the following detailed discussion describe embodiments to filter snoops of I/O agents an a system, persons of ordinary skill in the art will recognize that alternative embodiments may filter snoops of other types of system agents, such as various types of chipsets found on a computer system motherboard. Additionally, while many portions of the discussion describe filtering memory line snoops by storing address ranges in one or more tables, persons of ordinary skill in the art will also recognize that the term "table" may describe almost any collection of memory address ranges in some type of memory device and/or memory devices. In other words, "table" may generally refer to various lists and/or databases of addresses that an apparatus may use to track memory line ownership by I/O agents, which may include collections of addresses and ranges stored in more than one memory location of the system.

Turning now to the drawings, FIG. 1A depicts a quad-processor distributed shared memory system 100. In various embodiments, shared memory system 100 may be part of a laptop or a desktop computer, or some other computing apparatus, such as one server in a multiple-server system. As shown in FIG. 1A, shared memory system 100 may have several processors, such as processor 108, processor 132, and processor 120. Each processor may have a dedicated memory controller to interface with localized memory. For example, processor 108 has memory controller 106 to interface with memory 102. Memory 102 may contain data and operating instructions used by processor 108 while processor 108 operates.

Shared memory system 100 may map memories 102, 130, 122, and 138 into a global memory space in order to provide a single memory space available to all processors. For example, shared memory system 100 may map memory 122 and memory 138 into a global memory space. Once memories 122 and 138 are mapped, processor 108 may communicate with processor 120 via interconnect 114 to access data and/or operating instructions stored in memory 122. Similarly, processors 108 and 132 may retrieve data stored in memory 138 via interconnects 116 and 134, respectively.

Because of the dynamic interactions between the processors, memories, and other system agents, shared memory system 100 may need to maintain coherency of the global memory space. For example, processor 120 may need to perform operations on data in memory 102, such that the contents of memory 102 will be changed. To facilitate this change, processor 108 may relinquish ownership of the memory contents transferred to processor 120. Since processor 108 may maintain the original data in memory 102, shared memory system 100 may need to track the changes made by processor 120. Shared memory system 100 may track these changes and maintain coherency of the global memory space by snooping the contents of the cache memory for processor 120. Shared memory system 100 may therefore transfer ownership of memory contents and maintain their coherencies via snooping for various agents in shared memory system 100, including I/O agents.

As illustrated in FIG. 1A, shared memory system 100 may comprise one or more I/O agents, such as I/O agent 112 and I/O agent 136. I/O agents 112 and 136 may enable the processors of shared memory system 100 to perform input-output operations. For example, I/O agent 112 may enable processor 108 to perform input-output operations via interconnect 110, as well as enable processor 120 to perform input-output operations via interconnect 118. To enable processors 108 and 120 to complete the input-output operations in an efficient manner, without having to wait on I/O agent 112, I/O agent 112 may have a small amount of cache memory referred to as write cache. As alluded above, shared memory system 100 may need to snoop the contents of this cache memory to maintain memory coherency. Despite having this cache, though, I/O agent 112 may operate at a frequency considerably lower than the operating frequencies of processors 108 and 120. Operating at a lower frequency may cause slow snoop responses by I/O agent 112, which may ultimately limit the speed of overall memory access in shared memory system 100. Since I/O agent 112 may only contain, for example, 128 lines of memory there may be a high probability that I/O agent 112 does not contain the memory line of a snoop request issued by shared memory system 100. In other words, many snoop responses issued to I/O agent 112 will be clean and snooping I/O agent 112 will unnecessarily increase the memory latency of shared memory system 100. To limit the number of unnecessary snoops, distributed memory system 100 may employ an adaptive range snoop filter.

Figure 1B:
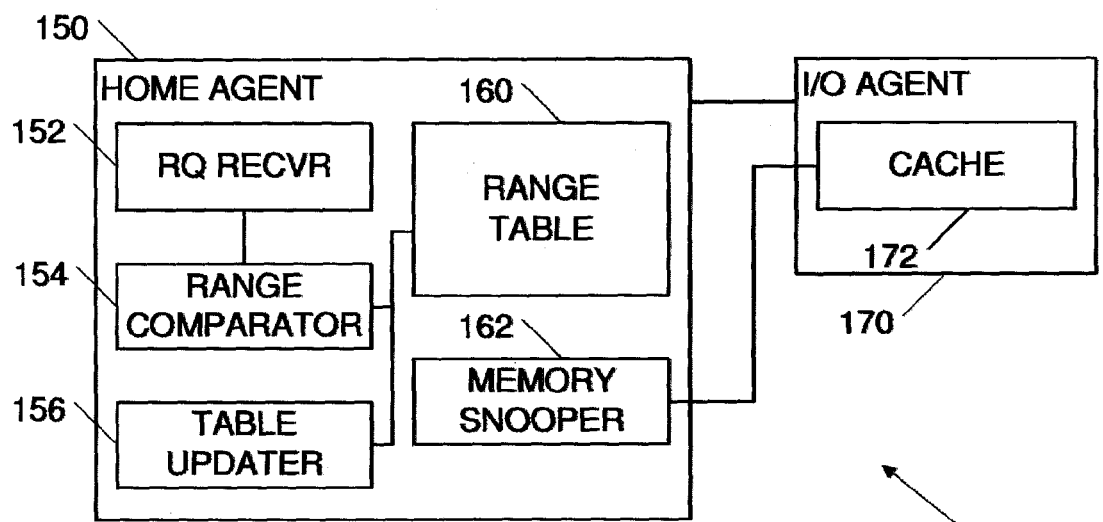
FIG. 1B shows an adaptive range I/O agent snoop filtering apparatus.

FIG. 1B shows an adaptive range snoop filtering apparatus 180 which may be used to filter snoops for one or more I/O agents. For example, snoop filtering apparatus 180 may be employed by shared memory system 100 in FIG. 1A to filter snoops made to I/O agent 112, to I/O agent 136, or both. Snoop filtering apparatus 180 may comprise a home agent 150. Keeping with our example, home agent 150 may comprise processor 108, processor 132, or another processor in FIG. 1A. Home agent 150 may comprise numerous component modules, such as request receiver 152, range comparator 154, range table 160, table updater 156, and memory snooper 162. Snoop filtering apparatus 180 may track which lines are stored in memory cache 172 of I/O agent 170. Home agent 150 may receive a request for a memory line via request receiver 152. Using the memory address of the requested memory line, logic in the modules of home agent 150 may decide whether I/O agent 170 needs to be snooped via memory snooper 162 based on a determination by range comparator 154. Range comparator 154 may compare the requested memory address with the addresses of one or more ranges stored in range table 160. If range comparator 154 indicates a miss then logic of home agent 160 will not issue snoops to I/O agent 170. On the other hand, if range comparator 154 indicates a hit, or match, then home agent 150 may issue a snoop to cache 172 of I/O agent 170 via memory snooper 162. Once the snoop response is received, home agent 150 may process the response and continue according to a coherency protocol specification.

Depending on the embodiment, how an I/O agent performs read and write requests may be important in order for proper operation of the adaptive range filter. That is to say, I/O agents 112, 136, and 170 in FIGS. 1A and 1B, may vary in different embodiments such that manner that the read and write requests are accomplished may require the adaptive range filter to operate differently.

I/O Agent Read Requests

In some embodiments, the I/O agent may not have a large cache to hold lines during reads of data and/or code. The write cache of the I/O agent, which may be referred to as "Wr$", may only hold cache lines that will be briefly owned by the I/O agent and then immediately written back to memory. Referring to FIG. 1B as an example, the write cache for I/O agent 170 may comprise cache 172. Additionally, depending on the embodiment, the I/O agent may issue two types of reads. One type of read, which may be referred to as a "read current", may not take ownership of the particular line in memory, but simply use it for immediate consumption without modifying or holding it. Another couple of types of read requests, which may be referred to as "read data" or "read code", may involve a system agent forwarding its copy of the latest version of the line from memory and invalidating its own copy of the line. Again, since the I/O agent may not have a read cache, the data may be immediately consumed and not cached.

I/O Agent Write Requests

Similar to the way read requests by an I/O agent may vary in different embodiments, the manner in which an I/O agent performs writes to memory may also vary from one embodiment to the next. Consequently, the order of events occurring during the write process may also be important for the appropriate functioning of the adaptive range filter. An I/O agent in many embodiments may operate in the described process which follows.

The I/O agent may first issue a "read for ownership" (RFO) to take ownership of a line by sending the RFO to a home agent, whereupon the home agent will snoop caching agents within the system. For example, I/O agent 112 may send an RFO to processor 108 via interconnect 110, causing processor 108 to initiate one or more snoops to cache memory agents of other processors in distributed memory system 100, such as processors 120 and 132. Upon receiving the RFO request and associated snoop responses, the home agent may issue a "grant", giving the I/O agent permission to modify that line of memory. The I/O agent may then update its write cache with the new data and then write the data to the home agent In writing the data back to the home agent, the I/O agent may, depending on the embodiment, fist send a write marker before sending the accompanying data packets.

The home agent may then receive the marker and write-data, write the data to memory, and issue a "complete" status indication to the I/O agent. Again keeping with our example, processor 108 may receive a marker and write-data, write the data to memory 102 or cause the data to be written to memory 138, and issue a "complete" status indication to I/O agent 112. Upon receiving the "complete" indication, the I/O agent may invalidate the line in its write cache. For example, in FIG. 1B, I/O agent 170 may invalidate a line in cache 172.

For embodiments that implement read and write requests in the manner just described, the only time that an I/O agent modifies data may be after the I/O agent has performed an RFO but before the data is written back. As a result, the adaptive snoop filter in such embodiments may only need to snoop the I/O agent during such periods of ownership. Even so, different embodiments may also snoop the I/O agent during other periods. For example, in embodiments where the I/O agent has a read cache, it may be beneficial to snoop the I/O agent after the I/O agent issues a "read current" request.

With an understanding of how the I/O agent read and write requests may operate, the functioning of a snoop filter employing adaptive ranges may now be examined in greater detail. The snoop filter may provide a way to not snoop I/O agents for requests originating from non-I/O agents. In FIG. 1B, request receiver 152, range comparator 154, table updater 156, and range table 160 may comprise a snoop filter for home agent 150. When home agent 150 receives a request for a memory line, via request receiver 152, from a system agent other than I/O agent 170, range comparator 154 may examine range table 160 to see if the requested memory line address matches any range. For example, range table 160 may contain one or more adaptive ranges, wherein range comparator 154 matches the requested address to one of the adaptive ranges in range table 160. If range comparator 154 finds a match, the requested memory line or cache line may be owned by an I/O agent, such as I/O agent 170. Upon a match, home agent 150 may then initiate a snoop of I/O agent 170 by triggering memory snooper 162. However, if range comparator 154 does not find a match, meaning the address does not match an adaptive range in range table 160, system performance may be improved by not snooping I/O agent 170.

Figure 2A:
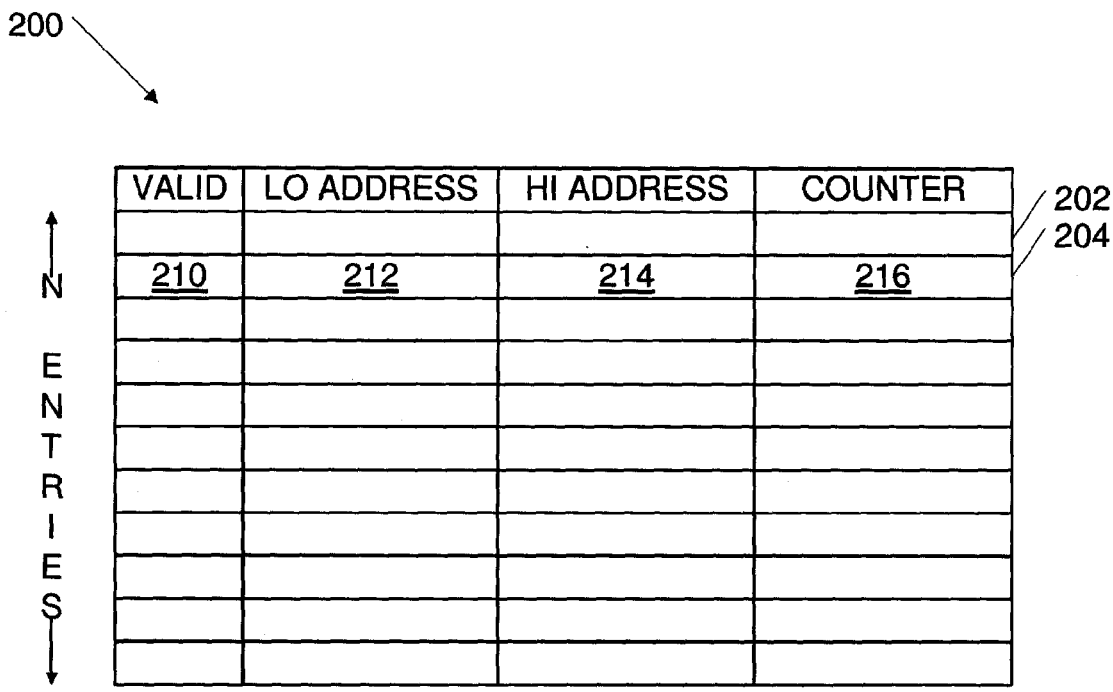
FIG. 2A shows an embodiment of a region filter table.

FIG. 2A shows a more detailed embodiment of an adaptive range table 200. As illustrated in FIG. 2A, range table 200 may comprise a number (N) of entries, such as entries 202 and 204. Each entry, such as entry 204, may comprise one adaptive range, each adaptive range having four fields: a valid bit field (element 210), a lo (low) address field (element 212), a hi (high) address field (element 214), and a counter field (element 216). The valid bit field (element 210) may indicate whether entry 204, or more specifically the range of entry 204, is valid. If a valid bit for an entry is not set, or set to a zero value, then a range comparator such as range comparator 154 may dismiss the table entry when performing a lookup of range table 200. In many embodiments, a single bit may suffice for the valid bit field. However, some embodiments may employ more bits to establish the range table entry status. Even further embodiments may not even have a valid bit field. For example, some embodiments may set the value of the low address field equal to or even greater than the value of the high address field. When a range comparator of such an embodiment sees that the value of the high address is not greater than the value of the low address, the range comparator may logically conclude that the entry is invalid and move to another entry in range table 200.

The low address field of an entry may represent the low-end address of a range. The precise number of bits may vary in different embodiments. Additionally, the number of address bits may be optimized to only contain a desired number of most-significant-bits (MSBs) of the low-range address. The low address may be the same length, have less, or have more bits than the high address. The high address of an entry may represent the high-end address of the range. The size of the high address may be equal to the number of bits necessary to represent the address but may be optimized to only contain a desired number of most-significant-bits of the high-range address. The high address may be the same length, have fewer, or have more bits than the low-address.

The counter field of an entry may comprise a number of bits arranged to represent a positive integer value. The number of bits may vary in different embodiments and be large enough to handle the greatest potential number of I/O agent outstanding RFO requests in the system. For example, an 8-bit register may be sufficient to handle up to four I/O agents.

To briefly illustrate how range table 200 may be updated and used to filter I/O agent snoops, we can refer back to FIG. 1B and discuss an embodiment in operation. A more detailed discussion follows for FIG. 3. When I/O agent 170 is about to perform a write operation, I/O agent 170 may first issue an RFO request to home agent 150 to own the requested cache line. When the RFO enters home agent 150 via request receiver 152, home agent 150 may update range table 160, which again may have the appearance of range table 200, via table updater 156. Table updater 156 may update range table 160 by finding a valid existing range and making a minor change to an upper or lower range address, so that the modified range limits encompass the RFO address. For example, if the RFO address equals 00F8 then table updater may find an entry or row in range table 160 having a low address equal to 00F1 and a high address equal to 00F2. Upon finding the close entry, table updater 156 may then change the high address from 00F2 to 00F8. Additionally, table updater 156 may increment a counter for that range entry. Continuing with our example, table updater 156 may increase the counter for the 00F1-to-00F8 entry from "2" to "3".

Alternatively, if a close range is not available, then table updater 156 may select an empty or invalid entry in range table 160, set the initial range to encompass the RFO address with a default range size, initialize the counter to 1, and set the valid bit to 1 for the newly created range. If no empty or invalid ranges exist, then table updater 156 may then update the closest range to encompass the RFO address, as well as increment the corresponding counter.

When I/O agent 170 has completed the write request, home agent 150 may then issue a "completion" back to I/O agent 170. Table updater 156 may then decrement the counter to the range entry the address belonged to. Continuing with our previous example, table updater 156 may decrement the 00F1-to-00F8 entry from "3" to "2". If the counter were to become zero during this process, then table updater 156 may invalidate the entry by setting its valid bit to 0. This process of receiving I/O agent requests, modifying low and high addresses of ranges in range tables, setting valid bits, and increasing or decreasing range counters for memory lines for which I/O agents assert ownership may allow for adaptive range snoop filtering of the I/O agents. In other words, employing this range-based filtering approach may allow home agents to track a "collection" of addresses, in adaptable ranges, instead of tracking precise addresses. Tracking precise addresses may require large quantities of memory to implement. However, as one may begin to appreciate, an adaptive range filter may be implemented using a comparatively smaller amount of memory.

Figure 2B:
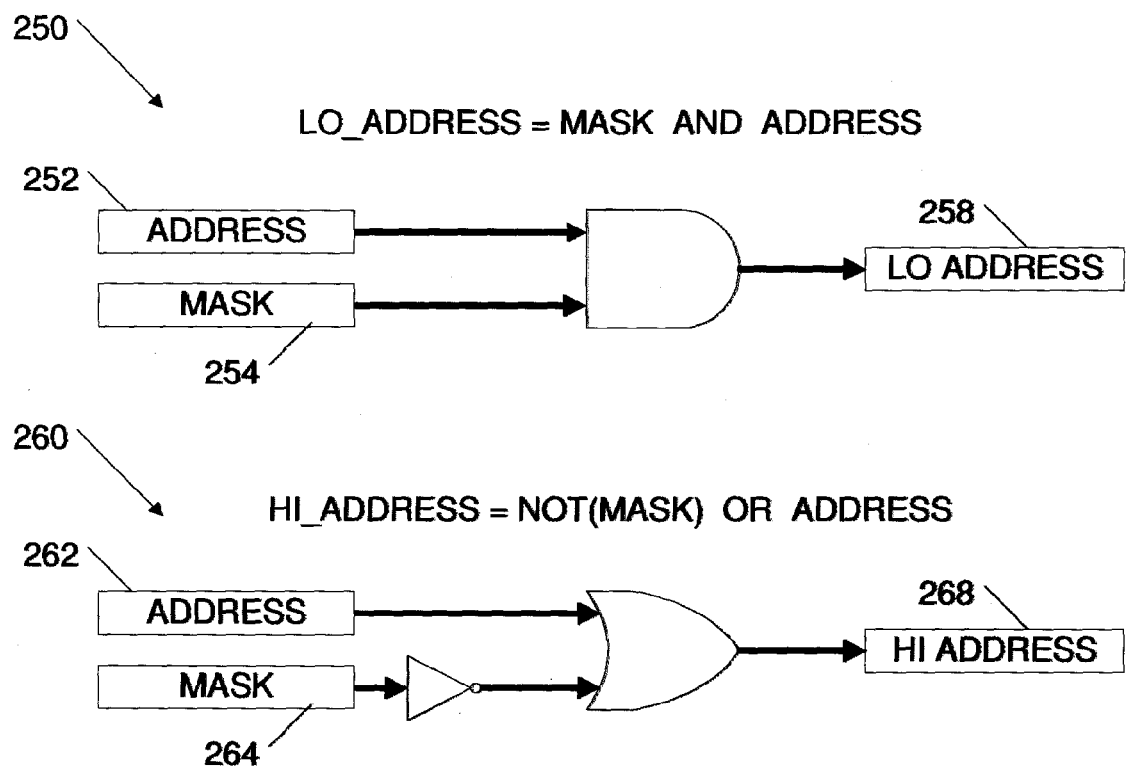
FIG. 2B illustrates embodiments of logic arrangements that use mask vectors to calculate high and low address fields for ranges in a range table.

FIG. 2B shows embodiments of logic arrangements that use mask vectors to calculate high and low address fields for ranges in a range table. For example, when table updater 156 initializes or updates an entry in range table 160, table updater 156 may employ mask vector 254 to create low address field 258 and employ mask vector 264 to create high address field 268 for a range entry. A default mask may be a mask vector that table updater 156 may use when a range entry is being initialized for the first time. For example, mask vector 254 may comprise a certain number of MSBs set to 1 with the remaining bits set to 0. If an RFO address is represented by address 252, table updater 156 may create low address field 258 by performing a bitwise AND operation with mask vector 254. Similarly, if an RFO address is represented by address 262, table updater 156 may create high address field 268 by performing a bitwise OR operation with the inverse of mask vector 264.

In alternative embodiments, the low address and/or the high address may be determined in different ways. For example, in some embodiments, the low address or the high address may be changed to equal the RFO address, without the need for masking. If a masking scheme is implemented, though, a default mask for mask 254 or a default mask for mask 264 may have the lower 12 bits set to 0 and remaining upper bits set to 1, which may give an address range of 4 kB. Such number of bits and corresponding address range may vary in different embodiments.

The case above may describe a process for initializing a new range entry. However, when table updater 156 updates an address range, the values for mask 254 or mask 264 may need to be recalculated. Table updater 156 may calculate mask 254 or mask 264 as a minimum number of least-significant-bits which need to be set to zero to encompass the address. The calculated value may comprise the mask value. However, rather than applying the mask value to generate both high address 268 and low address 258, table updater 156 may only need to perform a logical operation on the closest value, either high or low, to the requested RFO address.

A snoop filter employing adaptive ranges may perform three procedures, or go through three phases: the first being a lookup phase, the second being an update phase, and the third being a decrement or de-allocation phase. The lookup phase, which has already been described previously, may be considered to be when a home agent receives a request, such as either a "Read" or a RFO, from an agent other than the I/O agent to be snooped. If the address "hits" or matches an entry in the adaptive snoop filter range table, then the home agent logic may snoop the I/O agent or I/O agents and delay any other operations until the home agent receives the snoop response back from the I/O agent(s).

Update Phase

The update phase may be considered to be when the home agent receives an RFO from one I/O agent or another. During this phase, a table updater, such as table updater 156, may update the adaptive snoop filter range table, such as range table 160 or range table 200, by either allocating or initializing a new entry or by modifying or updating an existing entry so that the modified entry encompasses the RFO address.

Figure 3:
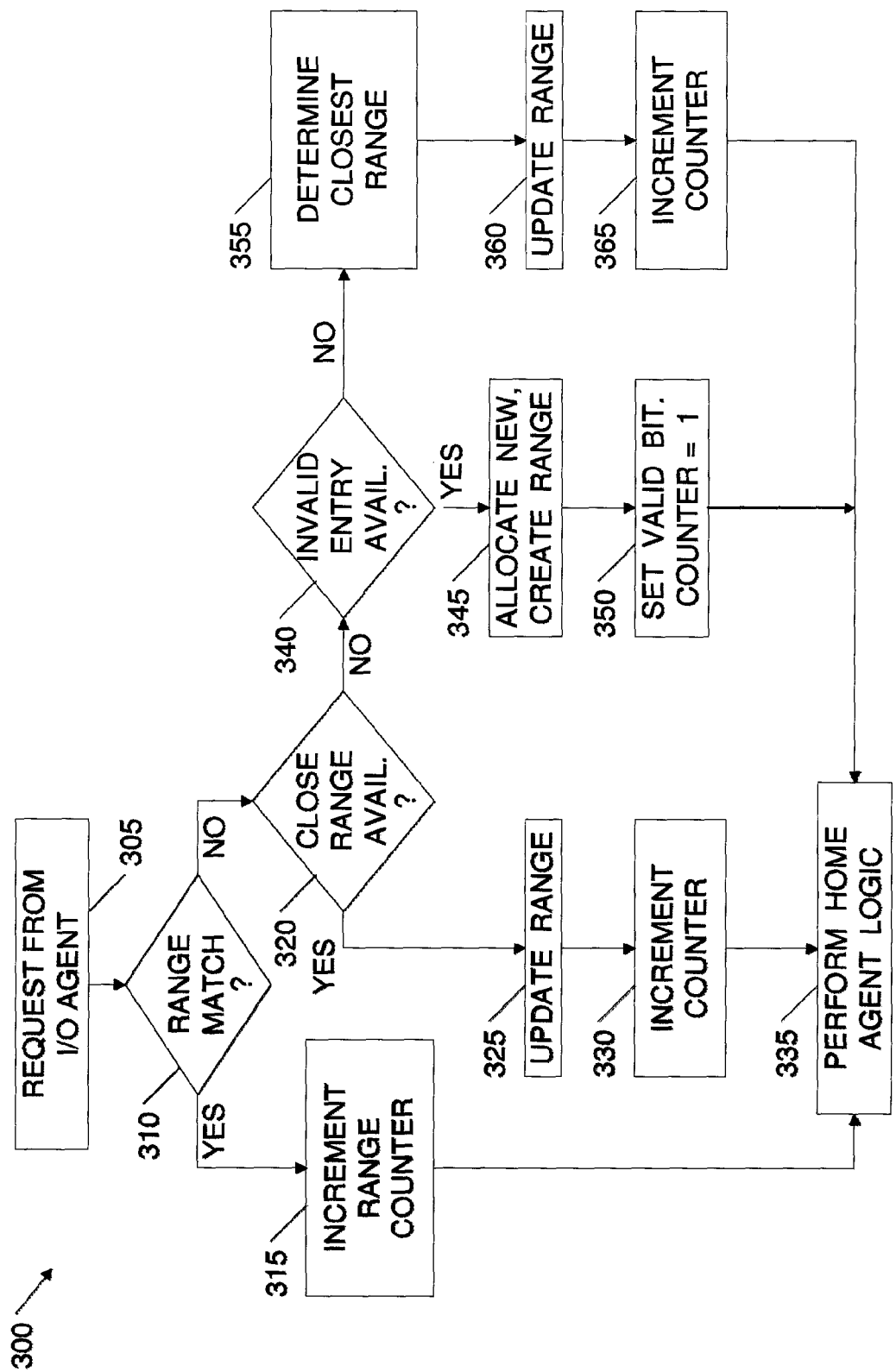
FIG. 3 shows an embodiment of a flowchart to update and/or create table ranges for an adaptive range snoop filter.

A flowchart 300 illustrating the update phase for one or more embodiments is depicted in FIG. 3. When a home agent receives an RFO request from an I/O agent (element 305), the home agent may compare the address of the RFO with each valid entry in the adaptive snoop filter range table for a match (element 310). Possible scenarios of this comparison may be categorized as: 1) an address match, 2) an address miss but a close range exists, 3) an address miss with no close range found with free entries available, and 4) an address miss with no close range and no free entries.

Address Match

If the address matches, then the counter for that particular entry in the range table may be incremented (element 315). The address matching logic may be implemented in various ways, with varying numbers of steps, varying numbers of elements in the range table, and with different masking processes. For an embodiment employing a range table like range table 200, an address may be considered to match if the following logic equation is satisfied: Match=valid AND (address>=lo_address AND address<=hi_address). In other words, a match may occur when the RFO address is greater than or equal to the low address and less than or equal to the high address, if the valid bit is set.

Address Miss but Close Range Exists

If the address does not match, a range comparator, such as range comparator 154 in FIG. 1B, may try to find a valid entry in the range table whose range is relatively close the address of the RFO address (element 320). For example, the range comparator may look for entries that are within ten bytes of the RFO address. If the range comparator finds a close range, then the table updater may update the range (element 325) of that entry by either adjusting the low or high address, depending which was closer to the RFO address, and incrementing the associated counter for that range (element 330). The value for the byte distance between the RFO value and the closest range value may be a performance tunable parameter, which may be a multiple of the step size. That is to say, the step size may be considered as the size in bytes the high or low address may be adjusted when updating the range. Some embodiments may select the byte distance as a maximum number of bits that the table updater may mask the table range address so that it encompasses the RFO address. In such embodiments, the table updater may mask the low address with 0's or mask the high address bits with 1's.

Address Miss with No Close Range Found with Free Entries Available

If no entry has a range close to the RFO address, then the table updater may check to see if there is an invalid range table entry available (element 340) in order to create a new entry. The table updater may create a new entry (element 345) by setting the valid bit, setting the low and high address fields, and initializing the associated counter field to 1 (element 350). The table updater may then mask the address with a certain number of LSBs, which may be determined by the step size, with 0's to form the low address for the range (element 345). The table updater may then apply the same mask to the same number of LSBs with 1's in order to form the high address (element 350).

Address Miss with No Close Rant and No Free Entries

In the event the range comparator cannot find a sufficiently close range and there are no free entries, the table updater, or the range comparator depending on the embodiment, may then resort to determining the closest range (element 355) and adjusting or updating it (element 360) to encompass the RFO address, as well as incrementing the associated counter (element 365). In updating the range (element 360), the table updater may mask the closer of either the low or high address with the minimum number of bits necessary to encompass the RFO address. The home agent may then proceed by performing other home agent logic (element 335).

Decrement or De-Allocation Phase

The snoop filter may enter the de-allocation phase when the logic of home agent 150 has finished serving a write-back from an I/O agent, such as I/O agent 170, and is about to send the "complete" to the I/O agent. During this time, table updater 156 may determine the affected entry in range table 160 of the adaptive snoop filter and decrement the counter of that entry. In other words, table updater 156 may work in conjunction with range comparator 154, locate the range associated with the completed operation, and decrement the associated counter of the range. If, after decrementing the counter, the resulting count is 0, then the snoop filter apparatus will have satisfied all requests within this range, such that no more memory lines having addresses within this range are owned by an I/O agent and need to be snooped. Therefore, the table updater may de-allocate the line by setting the valid bit to 0.

Figure 4:
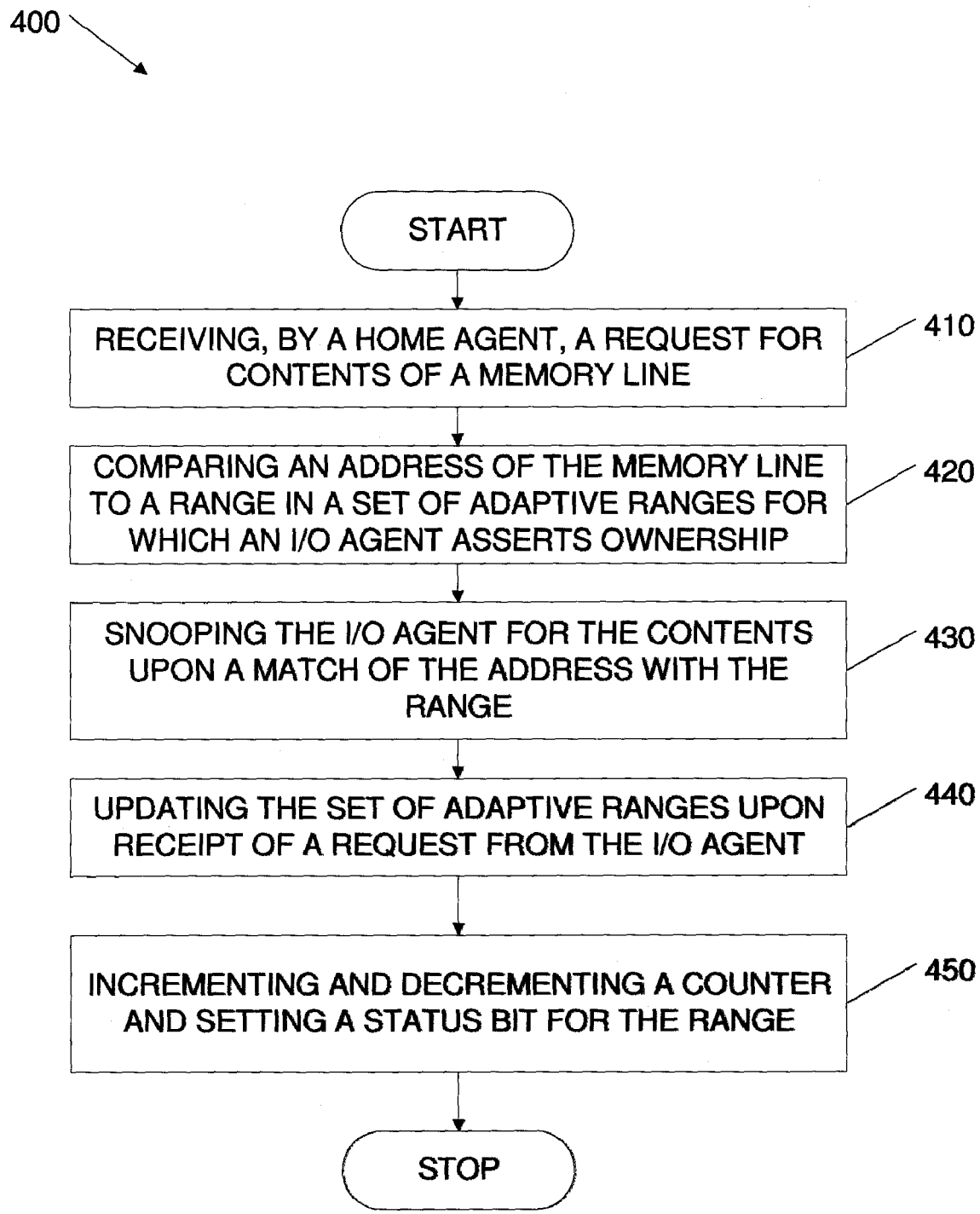
FIG. 4 illustrates a method for adaptively filtering snoops of I/O agents.

FIG. 4 depicts a flowchart 400 illustrating an embodiment of a method for adaptively filtering snoops of I/O agents. Flowchart 400 begins with receiving, by a home agent, a request for contents of a memory line (element 410). For example, one processor in a multiple processor system may request the contents of memory address ABCD1234 to a second processor, wherein the second processor may serve as the home agent. An embodiment according to flowchart 400 may compare the address of the memory line to a range in a set of adaptive ranges for which an I/O agent asserts ownership (element 420). Continuing the example above, hardware encoded logic and/or a software algorithm of the home agent may compare memory address ABCD1234 and find that it matches a range having a lower address of ABCD0000 and a high address of ABCDFFFF. In other words, one or more I/O agents may have asserted ownership for memory lines in the range of ABCD0000-to-ABCDFFFF. Upon a successful match from the comparison (element 420), an embodiment according to flowchart 400 may snoop the I/O agent for the contents (element 430).

An embodiment according to flowchart 400 may also update one or more sets of adaptive ranges (element 440), set status bits as well as increment and decrement counters associated with the ranges (element 450) based upon assertions of ownership by the I/O agent, as well as write-backs from the I/O agent. Continuing with the previous example, an embodiment according to flowchart 400 may set a status bit to 1, such as the "valid" bit for a range in a range table similar to range table 200, create a new entry in the range table, update low and high addresses for ranges in the table, and change the counts as the I/O agent asserts ownership or performs write-backs for cached memory lines.

It will be apparent to those skilled in the art having the benefit of this disclosure that the present invention contemplates methods and apparatuses to filter snoops to I/O agents using adaptive ranges. It is understood that the form of the invention shown and described in the detailed description and the drawings are to be taken merely as examples. It is intended that the following claims be interpreted broadly to embrace all the variations of the embodiments disclosed.

Although the present invention and some of its aspects have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, met or steps.

What is claimed is:

1. A method of filtering memory snoops, the method comprising:
receiving, by a home agent, a request for contents of a memory line;
comparing an address of the memory line to a range of addresses in a set of adaptive ranges, wherein the set comprises memory addresses for which at least one input-output (I/O) agent asserts ownership, wherein further each of the adaptive ranges in the set comprises an upper address and a lower address which define the range limits of each of the adaptive ranges, wherein further the home agent is configured to change at least one of a first upper address and a first lower address of a first adaptive range to adapt to changes of assertions of ownership of the address of the memory line by the at least one I/O agent; and
snooping one of the at least one I/O agent for the contents upon a match of the address of the memory line within the range of addresses.

2. The method of claim 1, further comprising updating the set of adaptive ranges upon receipt of a second request from one of the at least one I/O agent.

3. The method of claim 2, further comprising incrementing a counter associated with the range.

4. The method of claim 2, further comprising setting a status bit when one of the at least one I/O agent asserts ownership.

5. The method of claim 2, wherein updating the set of adaptive ranges comprises adjusting a second range.

6. The method of claim 5, wherein adjusting the second range comprises changing one of a second upper address and a second lower address.

7. The method of claim 2, wherein updating the set of adaptive ranges comprises adding a second range.

8. The method of claim 1, further comprising decrementing a counter associated with a second range upon a write-back from one of the at least one I/O agent.

9. The method of claim 8, further comprising changing a state of a status bit associated with the range.

10. A snoop filter apparatus, comprising:
   a range table configured to store adaptive ranges of memory lines, wherein an I/O agent asserts ownership of memory lines within the adaptive ranges, wherein further each of the adaptive ranges comprises an upper address and a lower address which define the range limits of each of the adaptive ranges;
   a table updater configured to update the adaptive ranges of the range table based upon assertions of ownership by the input-output (I/O) agent, wherein the table updater is configured to change at least one of a first upper address and a first lower address of a first adaptive range to adapt to changes of assertions of ownership of memory lines by the I/O agent;
   receiver module configured to receive a request for contents of a memory line; and
   a range comparator configured to compare a request address of the memory line request with a range address of the adaptive ranges, wherein the range comparator allows a snoop of the I/O agent upon a match of the request address and a range address.

11. The snoop filter apparatus of claim 10, wherein the range table comprises status bits associated with the adaptive ranges to indicate I/O agent ownership.

12. The snoop filter apparatus of claim 11, wherein the table updater updates the status bits.

13. The snoop filter apparatus of claim 10, wherein the range table comprises counters associated with the adaptive ranges to indicate I/O agent ownership of multiple memory lines.

14. The snoop filter apparatus of claim 10, wherein the table updater updates the adaptive ranges by adjusting one of a high address and a low address of an adaptive range.

15. The snoop filter apparatus of claim 10, wherein the snoop filter apparatus is part of a multiple processor computing system.

* * * * *

UNITED STATES PATENT AND TRADEMARK OFFICE
CERTIFICATE OF CORRECTION

| | | |
|---|---|---|
| PATENT NO. | : 7,730,266 B2 | Page 1 of 1 |
| APPLICATION NO. | : 11/695004 | |
| DATED | : June 1, 2010 | |
| INVENTOR(S) | : Krishnakanth Sistla et al. | |

It is certified that error appears in the above-identified patent and that said Letters Patent is hereby corrected as shown below:

In column 11, line 21, in claim 10, before "receiver" insert -- a --.

Signed and Sealed this

Twenty-first Day of September, 2010

David J. Kappos
*Director of the United States Patent and Trademark Office*